United States Patent Office 3,519,780
Patented July 7, 1970

3,519,780
METHOD OF ARC WELDING AND BUILDING UP OF PARTS
Arkady Grigorievich Potapievsky, Bulvar Likhacheva 3, kv. 75, and Vsevolod Feodosievich Lapchinsky, Ulitsa Artema 84, both of Kiev, U.S.S.R.
Filed May 12, 1967, Ser. No. 638,139
Int. Cl. B23k 9/04
U.S. Cl. 219—76     5 Claims

---

ABSTRACT OF THE DISCLOSURE

A method of arc welding and building up of parts is provided wherein a main current is applied to each of a number of electrodes to produce a corresponding welding arc and superimposed on this main current of each electrode is a current of impulses having an intensity of between 6 and 15 times the intensity of the main current and a duration of between 0.5 and 10 m. sec. to control melting of the associated electrode, transfer of electrode metal and weld penetration in the metal being welded.

---

The present invention relates to methods of arc welding and building up of parts of carbon and alloyed steels, as well as those of non-ferrous metals and their alloys.

Known at present are methods of arc welding and building up of parts with at least two electrodes, both consumable and non-consumable, in which the welding arcs are supplied from one or a plurality of sources of direct or alternating current.

The disadvantage of known methods is that therein are interlinked the processes of heating and fusing the base metal, formation of the welding seam and melting of the electorode metal. An improvement in one of said characteristics may thereby result in non-desirable variations of other characteristics. For example, an increase in the penetration depth by increasing the current intensity is likely to result simultaneously in a variation of the nature of the transfer of the electrode metal, and in an increase of the width of a zone of thermal effect as produced upon the part to be welded.

These peculiarities cansiderably limit the possibilities of using the welding with a plurality of welding arcs.

An object of the present invention is to provide a method of arc welding by the use of a plurality of welding arcs, which would allow controlling separately, independently one from another, the weld penetration in the base metal, thermal cycle, melting of electrode or filler wire, and the transfer of drops of electrode metal into a molten bath, with a view of drastically increasing the productivity and quality of the welding or building-up processes.

Besides, according to a protective gas being used, flux or coating, there must be ensured the stabilization of the arc when welding with the use of an alternating current, the elimination of sputtering, and an improvement in the formation of the welding seam.

The essential feature of the invention consists in the fact that upon the current of each welding arc there are impressed current impulses, by the aid of which there is effected the separate control of the processes of melting the electrode, the transfer of electrode metal and the weld penetration in the metal being welded.

It is expedient for a deeper penetration of the metal being welded, to make one of the electrodes as non-consumable, and to impress upon the current of the arc of this electrode, current impulses $(J_2)$, adopted in the following ranges with regard to the average value of current $(J_1)$ of the arc:

Intensity $J_2 = (8$ to $15)J_1$

Duration $t_2 = (2$ to $10)$ m.sec.

while for the fusion of all the other electrodes and the transfer of electrode metal upon the current of the arc of these electrodes there are impressed impulses of current $(J_3)$ adopted in the following ranges with regard to the average value of current $(J_1')$ of the arc:

Intensity $J_3 = (6$ to $10)J_1$

Duration $t_3 = 1.0$ to $2.5$ m.sec.

It is possible that for a deeper penetration of the metal being welded to take all the electrodoes os consumable ones, and upon the arc current of one of them to impress current impulses $(J_4)$ adopted in the following ranges with regard to the average intensity of the arc current $(J_1'')$:

Intensity $J_4 = (8$ to $15)J_1''$

Duration $t_4 = 0.5$ to $2.0$ m.sec.

while for the fusion of all the other electrodes and for the transfer of electrode metal upon the arc current of being welded to take all the electrodes as consumable $(J_3)$ adopted in the following ranges:

Intensity $J_3 = (6$ to $10)J'_1$

Duration $t_3 = 1.0$ to $2.5$ m.sec.

For a more rapid melting of electrodes, it is expedient to employ all the electrodes as consumable, and to impress upon the arc current of each electrode current impulses $(J_5)$, adopted in the following ranges with regard to the average value of the arc current $(J_1)$:

Intensity $J_5 = (6$ to $10)J_1$

Duration $t_5 = 2$ to $7$ m.sec.

For a preheating of the metal to be welded, it is possible to adopt one of the electrodes as non-consumable, and to impress upon the arc current of this electrode impulses of current $(J_6)$, adopted in the following ranges with regard to the average value of current $(J_1''')$ of the welding arc:

Intensity $J_6 = (8$ to $15)J_1'''$

Duration $t_6 = 7.5$ to $2$ m.sec.

while for melting all the other electrodes and transferring the metal, current impulses $(J_5)$ are to be impressed upon the arc current of these electrodes, taken in the following ranges with regard to the average value of the arc current $(J_7)$:

Intensity $J_5 = (6$ to $10)J_7$

Duration $t_5 = 2$ to $7$ m.sec.

Other objects and advantages of the present invention will become more fully apparent from a consideration of the following description of its exemplary embodiments, taken in conjunction with the appended drawing, in which.

Figure 1A:
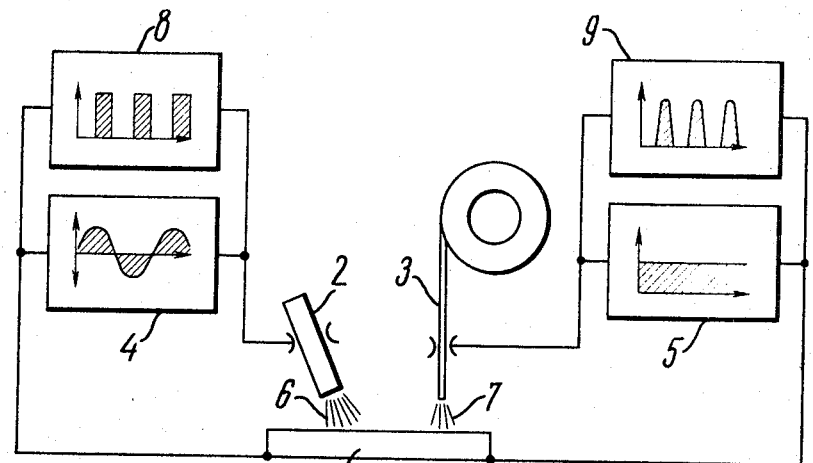
FIG. 1a represents a block diagram of the arc welding with the use of consumable and non-consumable electrodes for effecting the method according to the present invention.

The method of arc welding and building up of a part 1 (FIG. 1a) with the use of two electrodes is accomplished by a device for welding by the air of non-consumable electrodes 2 and consumable electrodes 3, comprising main sources 4 and 5 of supply of arcs 6 and 7, and sources 8 and 9, respectively connected in parallel therewith.

Figure 1B:
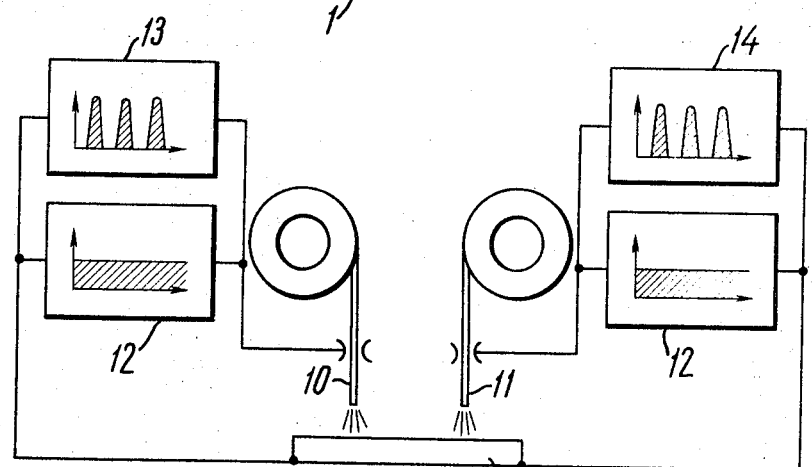
FIG. 1b is a block diagram of the arc welding with the use of two consumable electrodes for effecting the method according to the present invention.

When welding the part 1 with the use of two consumable electrodes 10, 11 (FIG. 1b), employed as a main source are direct current sources 12 and sources 13, 14 of impulses. When carrying into effect the arc welding of various parts of carbon and alloyed steels non-ferrous metals and their alloys, there arises the necessity to control separately both the weld penetration in metal of the part and the thermal cycle of welding, melting of the electrode, transferring of drops of the electrode metal, and some other features of the welding process.

With a view of providing these conditions when welding with the use of a plurality of electrodes, impulses of current from the sources 8, 9 or 13, 14 or sources of impulses (FIGS. 1a, 1b) are to be impressed upon the current of each welding arc.

Figure 2A:
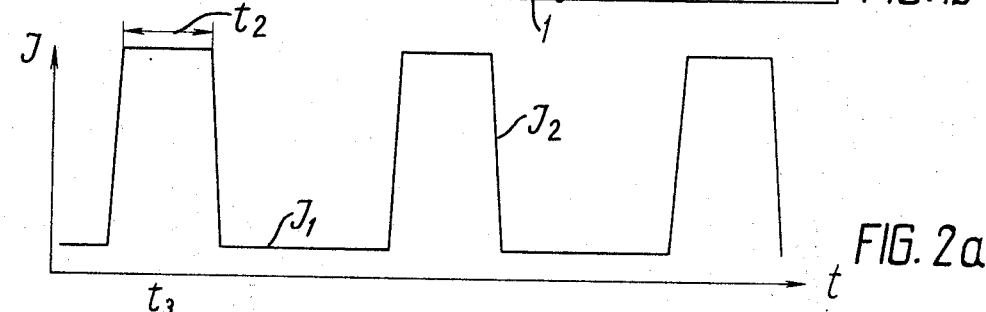
FIGS. 2a, 2b are graphical representations of variation in currents of welding arcs with respect to time when welding with the use of non-consumable and consumable electrodes, according to the present invention.

In such a manner, for butt welding at high speeds without any preparation of edges to be joined, there are adopted one non-consumable electrode 2, and impulses of current $J_2$ are impressed upon the current $J_1$ (FIG. 2a) of this electrode, the value of said impulses being taken equal to $(8 \text{ to } 15)J_1$, while the duration $$t_2 = 2 \text{ to } 10 \text{ m.sec.}$$

which provides for a deep penetration in the edge of the welded joint.

Figure 2B:
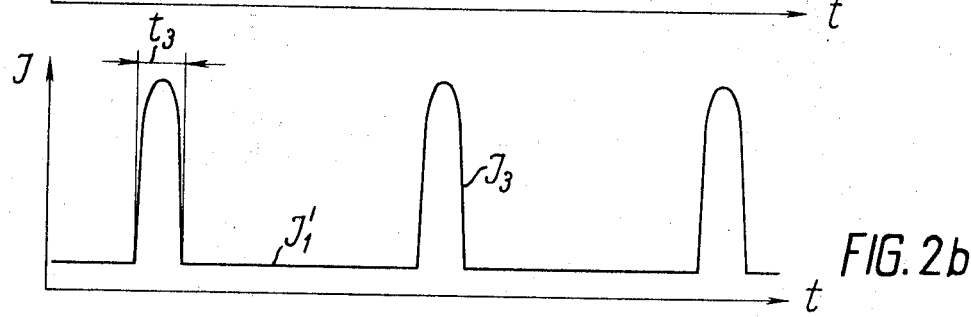

The second electrode is adopted to be consumable, and upon the current $J_1'$ of the arc of this electrode (FIG. 2b) there are impressed impulses of current $J_3$ having the following characteristics:

Intensity $J_3 = (6 \text{ to } 10)J_1'$

Duration $t_3 = 1.0$ to 2.5 m.sec.

thereby is effected the transfer of metal in small drops and the melting of such an amount of electrodes which would enable to obtain a high-quality welding seam.

The depth of weld penetration in the part to be welded may be increased by the use of only consumable electrodes. In this case, upon the current $J_1$ of the welding arc of the first electrode there are impressed impulses of current $J_4$, having the value with regard to the average value of current $J''_1$ of this arc $J_4 = (8 \text{ to } 15)J''_1$ and the duration $t_4 = 0.5$ to 2.0 m. sec. To achieve a deeper penetration in the metal being welded, upon the arc current $J'_1$ of the second electrode there are impressed impulses of current $J_3$ so as to provide for the transfer of electrode metal in small drops and the melting of such an amount of the electrode, which would ensure the obtaining of the welding seam of required quality.

If only one part of thick-metal is to be welded with the preparation of edges, or of thermally hardened alloys, then it becomes necessary to obtain an insignificant weld penetration in the part; in this case, it is also expedient to employ a plurality of consumable electrodes; upon the current of the arc thereof there are impressed impulses of current $J_5$, providing for a rapid melting of the electrodes.

The value of current $J_5$ of impulses is adopted in the following ranges with regard to the average value $J'_1$ of the current of each arc:

$J_5 = (6 \text{ to } 10)J'_1$, while the duration of the impulses is adopted to be equal to $t_5 = 2$ to 7 m. sec.

With a rapid welding of a part manufactured of metals possessing a high thermal conductivity, preceded by a preparation of edges of the part, there is adopted one electrode as non-consumable, while the other electrode is consumable. Upon the current of the arc of the first electrode there are impressed impulses of current $J_6$ whose value is adopted in the following ranges with regard to the average value of the current of the arc $J'''_1 : J_6 = (8 \text{ to } 16)J'''_1$, while the duration $t_6 = 0.5$ to 2.0 m. sec.; upon the current $J_7$ of the arc of the second electrode there are impressed impulses of current $J_5$, having the following characteristics: value $J_5 = (6 \text{ to } 10)J_7$; duration $t_5 = 2$ to 7 m. sec. These impulses of current $J_5$ and $J_6$, when they are impressed upon the arc current of the non-consumable and consumable electrodes, are able to effect the preheating and fusing of the edges, a vigorous melting of electrodes, and the transfer of drops of the electrode metal.

The application of the method of arc welding with the use of a plurality of electrodes with the impression upon the current of each welding arc of impulses of current enables to considerably reduce the time of welding metals, and also to improve the quality of products as produced by the welding of building up processes.

What is claimed is:

1. A method of arc welding and building up of parts with at least two electrodes, said method comprising applying a main current to each electrode from a main source to produce a welding arc and superimposing on the main current of each electrode a current of impulses from a source connected in parallel with the main source of such electrode, the superimposed current having an intensity of between 6 and 15 times the intensity of the main current and a duration of between 0.5 and 10 m. sec. to control melting of the associated electrode, transfer of electrode metal and weld penetration in the metal being welded.

2. A method as claimed in claim 1, comprised in that with a view to deeper penetration in the metal being welded, one of the electrodes is non-consumable, and upon the main current of the arc of this electrode there are impressed impulses of current $(J_2)$, in the following ranges with regard to the average value of current $(J_1)$ of the welding arc:

Intensity $J_2 = (8 \text{ to } 15)J_1$

Duration $t_2 = 2$ to 10 m. sec.

while for carrying into effect the melting of all the other electrodes and transfer of the electrode metal, upon the main current of these electrodes there are impressed impulses of current $(J_3)$ in the following ranges with regard to the average value of current $(J_1')$ of the welding arc:

Intensity $J_3 = (6 \text{ to } 10)J'_1$

Duration $t_3 = 1.0$ to 2.5 m. sec.

3. A method as claimed in claim 6, comprised in that for achieving a deeper penetration in the metal being welded, all the electrodes are consumable, and upon the main current of the welding arc of one of them there are impressed impulses of current $(J_4)$ in the following ranges with regard to the average value of the current $(J''_1)$ of the welding arc:

Intensity $J_4 = (8 \text{ to } 15)J''_1$

Duration $t_4 = 0.5$ to 2.0 m. sec.

while for melting the remaining electrodes and transferring the electrode metal, upon the main current of the welding arc of these electrodes there are impressed impulses of current $(J_3)$ in the following ranges:

Intensity $J_3 = (6 \text{ to } 10)J'_1$

Duration $t_3 = 1.0$ to 2.5 m. sec.

4. A method as claimed in claim 1, comprised in that for a more rapid melting of electrodes, all the electrodes are adopted to be consumable, and upon the main current of the welding arc there are impressed impulses of current ($J_5$) in the following ranges with regard to the average value of the current of the welding arc ($J_1$):

Intensity $J_5 = (6 \text{ to } 10)J_1$

Duration $t_5 = 2$ to 7 m. sec.

5. A method as claimed in claim 1, comprised in that for effecting the preheating of the metal being welded, only one of the electrodes is consumable, and upon the main current of the arc of said electrode there are impressed impulses of current ($J_6$), in the following ranges with regard to the average value of current ($J'''_1$) of the welding arc:

Intensity $J_6 = (8 \text{ to } 15)J'''_1$

Duration $t_6 = 0.5$ to 2.0 m. sec.

while for melting all the other electrodes and transferring the electrode metal, upon the main current of the arc of said electrodes there are impressed impulses of current ($J_5$) in the following ranges with regard to the average value of current ($J_7$) of the welding arc:

Intensity $J_5 = (6 \text{ to } 10)J_7$

Duration $t_5 = 2$ to 7 m. sec.

References Cited

UNITED STATES PATENTS

| | | | |
|---|---|---|---|
| 2,837,627 | 6/1958 | Soulary | 219—130 X |
| 2,868,954 | 1/1959 | Skinner et al. | 219—130 |
| 3,274,371 | 9/1966 | Manz et al. | 219—137 |
| 3,361,892 | 1/1968 | Spencer | 219—131 |
| 3,365,564 | 1/1968 | Boughton | 219—131 |

JOSEPH V. TRUHE, Primary Examiner

C. L. ALBRITTON, Assistant Examiner

U.S. Cl. X.R.

219—130, 135, 137